H. F. THOMPSON.
IRRIGATING DEVICE FOR TREES.
APPLICATION FILED FEB. 2, 1911.

1,010,819.

Patented Dec. 5, 1911.

ATTEST

INVENTOR
HIRAM F. THOMPSON
By Fisher Moore ATTYS.

UNITED STATES PATENT OFFICE.

HIRAM F. THOMPSON, OF LEXINGTON, OHIO.

IRRIGATING DEVICE FOR TREES.

1,010,819.  Specification of Letters Patent.  Patented Dec. 5, 1911.

Application filed February 2, 1911. Serial No. 606,164.

*To all whom it may concern:*

Be it known that I, HIRAM F. THOMPSON, citizen of the United States, residing at Lexington, in the county of Richland and State of Ohio, have invented certain new and useful Improvements in Irrigating Devices for Trees, of which the following is a specification.

Figure 1:
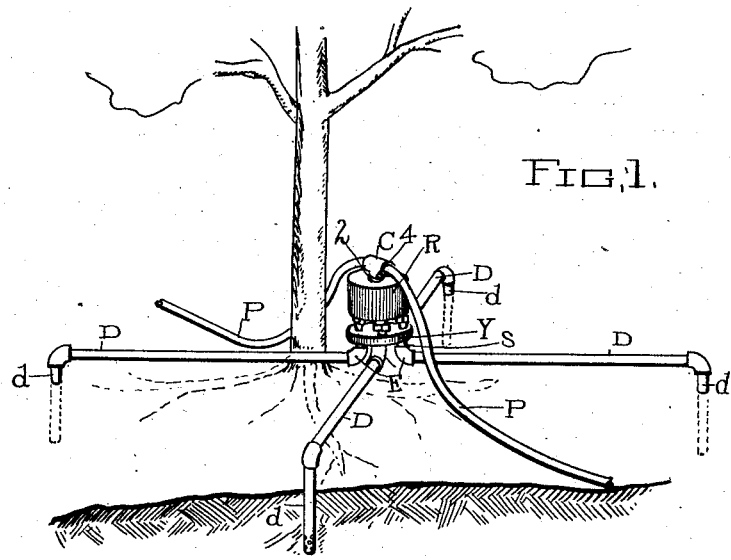
Figure 2:
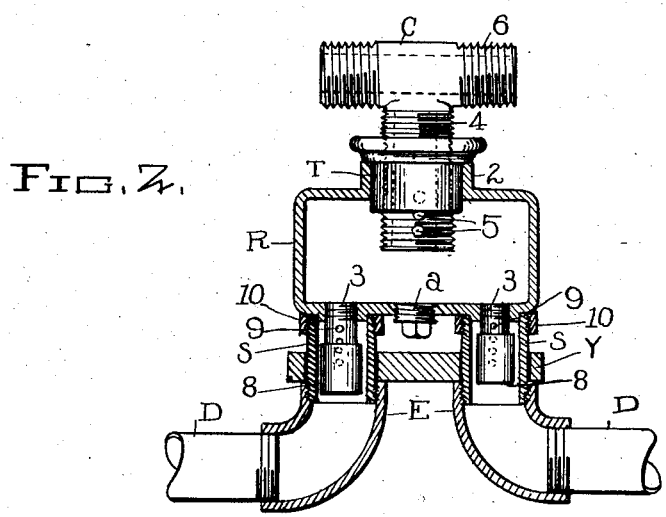

My invention relates to an irrigating device for trees, and especially for fruit trees in orchards, and the invention as here shown involves a means adapted to be used with an individual tree, and a line pipe or hose to run from tree to tree in that connection.
In the accompanying drawings, Figure 1 is a perspective view of my new and improved irrigating means or devices shown as located at the side of a tree and having irrigating branches leading therefrom to different portions of the area about the tree as may be deemed best. Fig. 2 is an enlarged central sectional elevation of the device as shown in Fig. 1 but with the distributing pipes broken off.
As shown in Fig. 2 the complete device comprises several parts which coöperate in the proper distribution of the water to each tree and said parts consist essentially in a receptacle R, which may be of any suitable material and has a relatively small capacity and is provided with an inlet neck 2 at its top and center and a plurality of outlet holes at its bottom into which externally threaded nipples 3 are screwed from below for the outflow and distribution of the water under a graduated flow as will presently be seen, except at the middle where the central hole is stopped with a plug *a*.

At the top a substantially T shaped coupling C has its stem 4 externally threaded and screwed through a thimble T seated snugly in the neck 2 of said coupling is receptacle R, and adjustable in said thimble to expose one or more of its perforations 5 according as more or less flow of water is desired. The immediate end of said stem 4 is closed and water can only flow through the perforations 5 as they are exposed, one and a half being shown as open in Fig. 2.
The arms 6 of said coupling also are threaded in this instance to connect the water supply pipe P, but they might be constructed with nipple ends to connect rubber hose, and the water flows through said stems and pipe or hose connections P from tree to tree and deposits enough at each tree through the regulated stem 4 to serve that particular purpose. It has also been found that the area or spread of the water from a given center or point, say the end of one of the several distributing pipes D, does not extend over three to six feet therefrom in any given direction, much depending on the character of the soil or sub-soil and other conditions which need to be studied in the use of the device. Obviously, a sandy soil would have comparatively little lateral distribution. Hence also the possible need of the maximum number of distributing pipes in order to reach all portions of the tree root area. The coupling C controls the water supply through rotary adjustment in thimble T while there are several nipples 3 in the bottom of receptacle R which govern the outflow of the distributing pipes D. These have separate down extensions *d* coupled therewith and perforated at their ends to discharge the water, said extensions *d* being intended to penetrate the surface soil more or less to get the discharge in the earth near the roots. Elbows E connect said distributing pipes with short coupling sleeves S having threaded connection therewith, and said sleeves inclose the nipples 3 and gaging cups 8 threaded thereon from below and adapted to control the perforations 9 in said nipples to graduate the flow of water. Thus, the supply of water to the pipes D may be regulated and varied or entirely cut off, and the coupling sleeves S are connected by a yoke Y and have the receptacle R removably seated thereon as shown. To this end the bottom of said receptacle has an annular rim or bead about each hole for nipple 3 adapted to seat in the upper end of a corresponding sleeve S, and said sleeve has a band 10 about its top which is removable to apply and remove said yoke.

The screw plug *a* can be removed to connect a direct distributing pipe, and it can be used for a single such pipe when the tree is young and lateral distribution is not needed.

This irrigating device is essentially a portable device adapted especially for tree irrigation, and it has the advantage of being so constructed that it can be moved about under a tree or from tree to tree from time to time as may seem best, and it especially has perfect adaptability to hillside conditions where the several legs can be leveled up by merely projecting them more or less into the ground for leveling purposes and the means for controlling the flow of the water are such as to limit or increase the flow by merely rotating the coupling member C in the thimble T. The said thimble has a smooth exterior surface and seats snugly in the neck of the receptacle but can be lifted bodily out with the coupling C for any needed purpose, such as shifting the device from one position to another under the same tree or from tree to tree.

What I claim is:

1. In tree irrigating devices, a portable water distributing receptacle adapted to be located at any available spot about a tree and having an opening in its top, a thimble seated in said opening and interiorly threaded, in combination with a T shaped pipe coupling having a threaded stem projecting through said thimble and provided with one or more outlet holes in its side adapted to be covered by said thimble and said thimble having a smooth exterior surface and adapted to be lifted off said receptacle with the said coupling therein.

2. A portable receptacle for irrigating trees having a single inlet opening in its top and a plurality of outlet openings in its bottom, distributing pipes having elbow connections with said outlet openings and perforated downward extensions at their outer ends adapted to enter the earth, and means connected with said outlet openings to regulate the flow of water through the same.

3. A portable water distributing receptacle for irrigating trees provided with means in its top to govern the flow of water into the same and means at its bottom to govern the distribution of water therefrom, the latter comprising perforated nipples engaged in the bottom of the receptacle, cups screwed onto said nipples to govern the flow of water through the same, open ended sleeves fixed on the bottom of the receptacle about said nipples and cups and apart therefrom and distributing pipes coupled upon said sleeves.

In testimony whereof I affix my signature in the presence of two witnesses.

HIRAM F. THOMPSON.

Witnesses:
E. M. FISHER,
F. C. MUSSUN.

Copies of this patent may be obtained for five cents each, by addressing the " Commissioner of Patents, Washington, D. C."